Dec. 29, 1964     C. A. DARLING     3,163,176
APPARATUS FOR SENSING AND CONTROLLING FLUID FLOW
IN THE FORM OF DISCRETE FREE-FALLING DROPS
Filed March 14, 1962     3 Sheets-Sheet 1
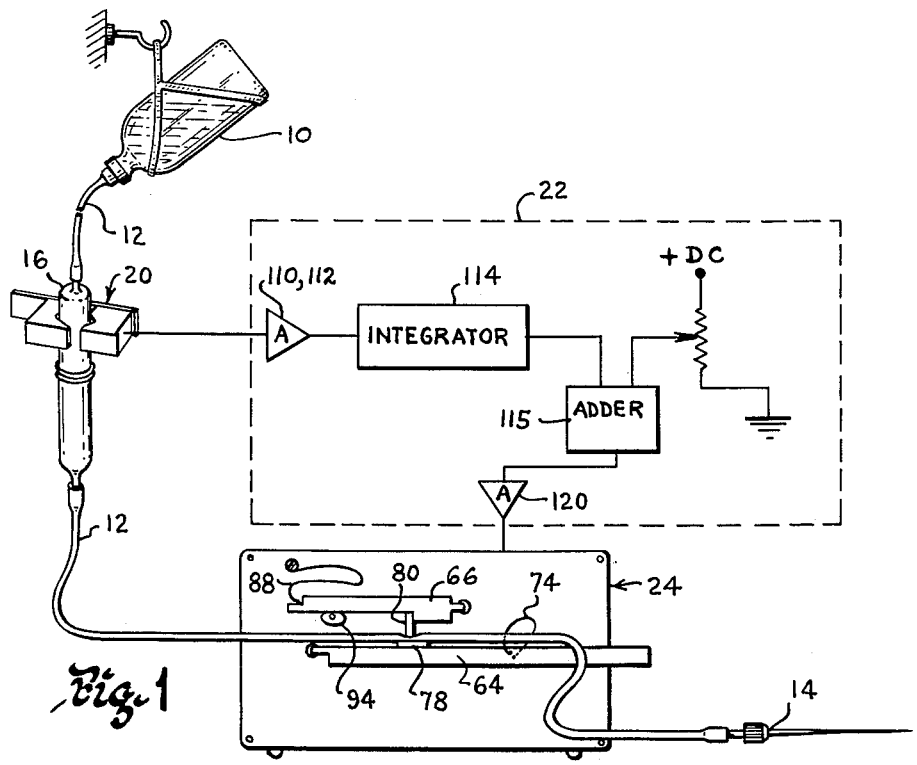
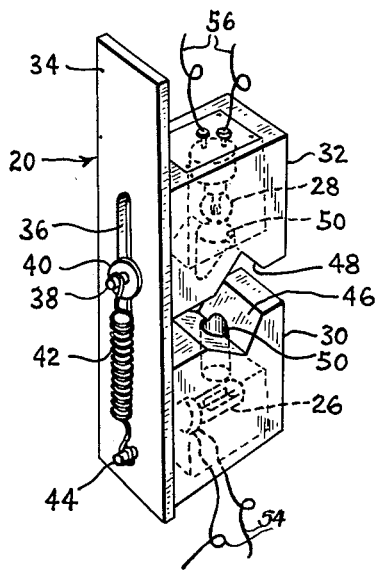
INVENTOR.
CHESTER A. DARLING
BY Steward & Steward
ATTORNEYS Dec. 29, 1964 C. A. DARLING 3,163,176
APPARATUS FOR SENSING AND CONTROLLING FLUID FLOW
IN THE FORM OF DISCRETE FREE-FALLING DROPS
Filed March 14, 1962 3 Sheets-Sheet 2

INVENTOR.
CHESTER A. DARLING
BY Steward & Steward
ATTORNEYS

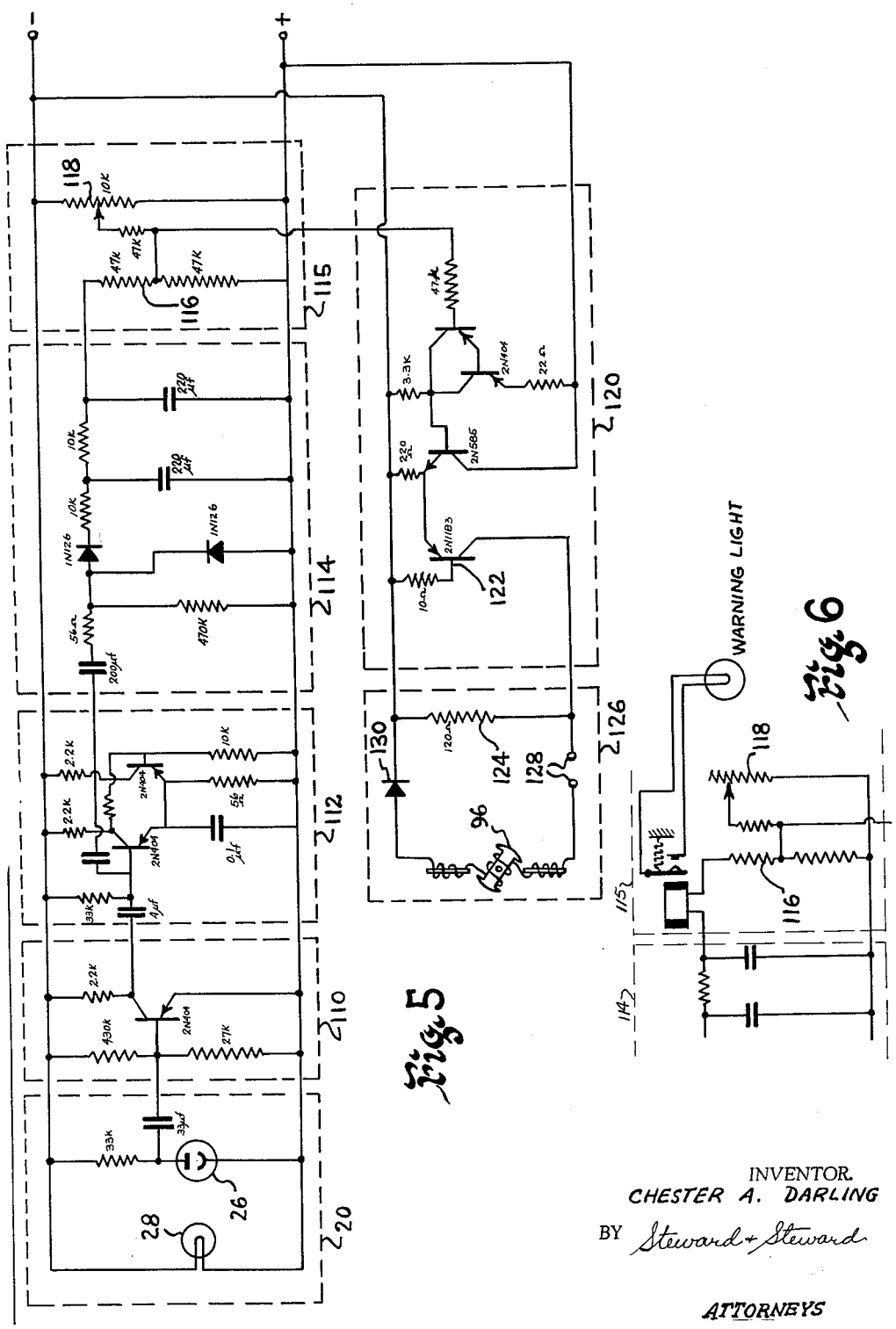

United States Patent Office 3,163,176
Patented Dec. 29, 1964

3,163,176
APPARATUS FOR SENSING AND CONTROLLING FLUID FLOW IN THE FORM OF DISCRETE FREE-FALLING DROPS
Chester A. Darling, Bristol, Conn., assignor to Barth Engineering and Manufacturing Company, Inc., Meriden, Conn., a corporation of Connecticut
Filed Mar. 14, 1962, Ser. No. 179,664
10 Claims. (Cl. 137—487.5)

This invention relates to accurate control of fluid flow, more particularly to flow in the form of discrete, free-falling drops, and to devices for effecting such flow at a constant, predetermined rate.

The invention finds particular application in blood transfusion and intravenous feeding but obviously is capable of many other uses where it is desired to control the rate of fluid flow in a drop-wise manner, and/or to control the volume of fluid thus delivered.

In blood transfusions or in intravenous feeding it is important to control or maintain a particular rate of flow of the fluid to the patient in order to prevent injury arising from transfer of either too little or too much fluid to his system. The desired rate at which the fluid is fed will depend on a number of factors, including the type of fluid and the condition of the patient. In present practice, it is customary for a nurse or doctor to adjust the flow rate by observation, using a stop watch, to time the drop rate of the fluid in a sight glass or drop chamber incorporated in the usual recipient set used in making transfusions. These sets comprise a reservoir or container for the fluid to be transferred, and flexible tubing leading from the reservoir to a hypodermic needle by which the fluid is of course actually introduced into the vascular system of the patient. Also included in the set is a transparent drop chamber (usually incorporating also a filter), and means for suspending the reservoir and drop chamber for gravity feed of the fluid to the patient. The drop chamber is suspended vertically and a valve or adjustable pinch clamp is provided in the system so that the flow can be adjusted to produce distinct, free-falling drops in the drop chamber. The flow rate can then be determined by observing the chamber and counting the number of drops in a given interval of time. The system, from the needle back to the reservoir, is a closed one, and back-pressure at the needle, caused by temporary stoppage, reflects back to the reservoir and prevents further delivery of fluid. This is true notwithstanding the fact that the drop chamber will normally not be full of fluid. As a consequence, it is immaterial where the pinch clamp is placed along the delivery tube. Usual practice however is to place the clamp below the drop chamber.

Under the system presently used almost universally, it is necessary for a nurse or doctor to check the flow rate frequently to make sure that it is proper. Changes in condition or position of the patient, as well as ambient temperature changes, may cause the drop-rate to vary from the desired norm. There is the further problem arising from exhaustion of the fluid supply in the reservoir, in which event the receipient set should be removed from the patient or, if further transfer is to be effected, a fresh reservoir of fluid provided. At present, both of these problems are handled primarily by reliance upon the nurse or doctor being close at hand at all times during the transfer, or by estimating the approximate time of depletion of the supply and remembering to return to the patient at that time.

It is a general object of the present invention to provide means for automatically controlling the drop-wise feed of the fluid at a selected rate which may be adjusted over a suitable range of drop rates. In achieving this objective, the system herein proposed is readily adaptable to existing types of standard recipient sets, in a manner such that no change in these is required in any respect. Further, the control effected by the present invention is accomplished by means entirely external to the fluid flow so that there is no possibility of contamination. Compactness and lightness of the several components of the system, along with ruggedness, are provided so that the system is easily handled and is noncritical in operation.

A further object is to provide a control system that provides for automatic warning to an attendant of discontinuance of the flow for any reason, and for remote indication of this condition whereby a single attendant at a central control station can monitor a number of such installations simultaneously.

The control system of the present invention consists essentially of a drop-sensing or pickup unit which is attachable to the drop chamber of the conventional recipient set. The pickup unit detects the drop frequency in this chamber and produces electrical pulses of corresponding frequency. Also included in the system are amplifying and control circuits to which the pickup is connected, which circuits effect a suitable comparison of the actual drop frequency with a selected rate desired to be maintained. Variation between the actual and desired rates produces an error signal which is then utilized to control the position of a flow restricting device located along the delivery tube of the recipient set. This flow restricting device comprises an adjustable clamp, and the plastic or rubber tubing used to deliver the fluid to the needle is placed in the jaws or bite of this clamp. Variation in the setting of the clamp determines the restriction in the flow passage and thus determines the drop-rate of fluid flow from the reservoir. As already mentioned, the fluid passage from the reservoir, including the drop chamber, is a closed system and consequently the flow restricting mechanism may be located at any point in the system, above or below the drop chamber, so that the point of attachment of the clamp when installed by an attendant is quite immaterial.

A presently preferred form of apparatus for accomplishing the foregoing objectives is illustrated in the accompanying drawings and described in detail hereinafter. It will beocme apparent from the following description that various modifications in the particular details of the specifically illustrated apparatus may be made within the scope of the inventiton and the specific apparatus here illustrated is accordingly intended primarily to provide an explanation of one means of carrying out the invention which has been found most effective.

With reference to the drawings,

FIG. 1 is a schematic representation of the control system of the invention as applied to a standard recipient set used in blood transfusion or intravenous feeding;

FIG. 2 is a perspective view of a drop-sensing or pickup unit employed to sense the drop-rate of the fluid flow to the patient;

FIG. 5 is a circuit diagram of the electrical control system; and

FIG. 6 is a fragmentary schematic of a modified form of the circuit shown in FIG. 5.

Figure 3:
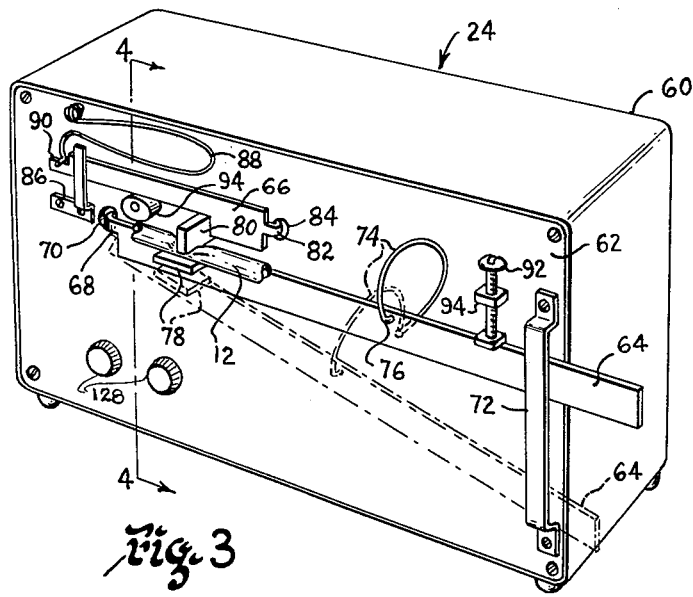
FIG. 3 is a view in side elevation of a flow-restricting or clamp unit employed to pinch the elastic tubing of the recipient set and thus control the drop-rate of fluid flow to the patient.

Referring to FIG. 1, a typical transfusion recipient set is shown comprising a fluid reservoir 10 suspended in any suitable manner to cause gravity flow through flexible tubing 12 to a hypodermic needle 14 by which the fluid is introduced into the vascular system of the patient. A transparent drop chamber and filter unit 16 inserted in the tubing, when suspended vertically as shown, permits observation of the drop rate of fluid flowing through the system.

In the practice heretofore used, control of the drop rate in these recipient sets has been by means of a manually adjusted screw clamp member which engages the resilient tubing 12 and is set by the doctor or nurse to provide a desired rate of flow to the patient. Conventionally, the attendant has adjusted the flow by clocking the free-falling droplets formed in the drop chamber within a given period of time.

In the present invention, the clamp and its manual adjustment are replaced by means for continuously sensing the drop rate of fluid in the drop chamber, comparing this with a desired standard to be maintained, and constantly motivating a flow restricting member to maintain precisely the desired drop frequency. The system comprises broadly a pickup head or drop-sensing unit 20 for attachment to the standard drop chamber 16, electronic control means 22 responsive to the drop sensing unit, and a variable clamp or restrictor 24, operated by the control means, to maintain desired restriction in tubing 12.

Details of pickup 22 are best seen in FIG. 2. This unit incorporates a photocell 26 and a light source 28 in a small shield or housing. Photocell 26 is mounted in a housing member 30, comprising one half of a jaw, the other half being formed by member 32. Member 30 is fixedly mounted to a backing or supporting plate 34. The complementing member 32 is likewise mounted on supporting plate 34 but is arranged to be slidable toward and away from member 30. This is accomplished by providing an elongated slot 36 in backing plate 34 through which extends a pilot pin 38 secured to member 32. A washer 40 or other suitable retaining means overlapping the sides of elongated slot 36 is secured to pin 38 to maintain member 32 in sliding engagement with supporting plate 34. Extension spring 42, mounted between suitable projections provided on pilot pin 38 and the corresponding fixed mounting pin 44 of member 30, normally urges the members into endwise abutting relation. The abutting end faces of these members are notched, as at 46, 48, to provide a trough for reception of the cylindrical drop chamber, by which means a satisfactory gripping engagement with the chamber is obtained so that pickup 20 will be self-supporting, as shown in FIG. 1, when attached to the chamber. Such attachment is readily effected by momentarily separating the jaw members 30, 32 of the pickup unit and placing the unit astride the drop chamber, then releasing the movable member 32 to allow spring 42 to close the jaws and securely grip the drop chamber.

Each of members 30, 32 is hollow interiorly to provide space for photocell 26 and light source 28 units, respectively. Each of these members is also provided with a suitable aperture or bore which together provide communication between the respective interiors of the jaw members and their abutting faces, such bores being axially aligned and intersecting the trough or notches 46, 48 substantially midway of their length in the respective jaw members. A light path is thus established from light source 28 to photocell 26 through the respective bores, which path transversely intersects the center line of the drop chamber 16 when pickup head 20 is attached thereto. The usual electrical leads 54, 56, to the photocell and light source are provided to connect these units to electrical control unit 22.

Figure 4:
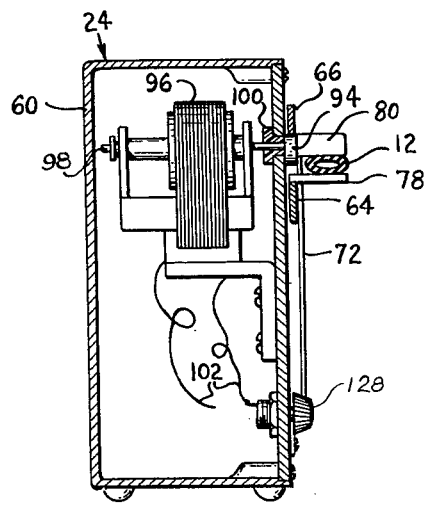
FIG. 4 is a sectional view on line 4—4 of FIG. 3.

Also connected to control unit 22 and actuated thereby is clamp unit 24 which serves to provide variable restriction in resilient tubing 12 and thus control the drop rate. This clamp unit, shown in greater detail in FIG. 3, is partially enclosed in a housing 60 and comprises a base plate 62 on which a pair of levers 64, 66 is mounted for pivotal movement parallel to base 62. Arm 64 pivots about a transversely bent integral lug 68 at its forward end, which lug projects into an aperture 70 in base plate 62. The opposite free end of arm 64 extends beyond the side edge of base 62 as a convenient means for shifting the arm from a normal position, shown in solid lines in FIG. 3, to an alternate position, shown in dotted lines, for a purpose which will be explained presently. Arm 64 is guided in such pivotal movement by a suitable bracket 72 secured to the base 62 so that the intermediate portion of the bracket is in spaced relation to the base. Arm 64 is normally urged into its upper (solid line) position by means of a suitable over-center toggle spring 74. One end of this spring is secured to arm 64 and the other to base plate 62. In the normal position, the point of securement of toggle spring 74 on lever 64 is disposed close to but above the point of securement of the opposite end of the spring to base plate 62. In this normal position, therefore, spring 74 biases the lever to pivot upwardly (i.e. counterclockwise in FIG. 3), about lug 68, from which position it is not readily dislodged by reason of the toggle effect. However, by manually depressing the extension of lever 64, spring 74 may be overcome and the lever moved to the dotted line position shown. The purpose of this is to permit the rapid and easy lateral insertion of the resilient tube 12 of the recipient set in the bite of the jaws provided by levers 64, 66. This bite is formed between an anvil plate 78 constituting a horizontal flange or tab on the upper edge of lever 64, and a blade or vertically disposed flange 80 formed by bending an integral tab portion of lever 66 at right angles to the general plane of the lever. As seen more particularly in FIG. 4, insertion of the tubing 12 into the bite of the jaw thus formed is readily accomplished by depressing lever 64 to open the bite between members 78, 80, and then raising the lever to its normal position while temporarily restraining the tube from lateral escape until engaged by the jaw members. This arrangement obviates any need to break into the flow passage of the recipient set to effect control of the flow through it, which is most important from the standpoint of maintaining sterility of the flow passages.

Lever 66 is likewise provided with an integral lug 82 similar to that of lever 64, and lug 82 also engages an aperture 84 in plate 62 to allow pivotal movement parallel to the face of the mounting plate. Lever 66 is restrained against sidewise motion by a suitable guide bracket 86 secured to base 62. The free end of lever 66 is biased for pivotal movement in a counterclockwise direction, as viewed in FIG. 3, by a suitable torsion spring 88, one of whose ends is secured to base plate 62, while the other is lodged in a notch 90 in the free end of the lever.

It will be apparent from the foregoing that the arrangement of levers 64, 66 is such as to cause the jaw members 78, 80 normally to pinch the tubing 12 and thus close off the flow passage therethrough. A zero-set adjusting screw 92, carried in a bracket 94 on plate 62, is provided to engage the upper edge of lever 64 adjacent its free end, whereby to set the zero or fully closed condition of the jaw members 78, 80, so that in such "zero-set" position complete cut-off of the flow passage through tubing 12 is just effected.

Countering the normal closing or cut-off bias of jaw members 78, 80 is an eccentric shaft or cam 94 which is disposed to engage the under edge of lever 66. Cam 94 is positioned by a motor 96 mounted on the rear face of support plate 62. Cam 94 constitutes an extension of shaft 98 of the motor which projects through a bearing 100 in plate 62 at a point just below the under edge of lever 66 substantially midway of its length. Normally the low point on the cam is disposed in contact with the lever 66. Angular rotation of cam 94 by motor 96 therefor causes upward pivotal displacement of lever 66, thereby opening the bite formed by jaws 78, 80. Motor 96 is required only to turn cam 94 through a part of a revolution, which is sufficient to provide ample range of flow rate control from cut-off to full flow. In practice, only a very small amount of clamping movement at the bite is necessary in order to go from a fully closed, shut-off condition to a maximum desired flow rate, such movement ordinarily being on the order of not over about 0.010 inch. This amount of adjustment can be accomplished with substantially less than a full rotation of cam 94, in fact 30° of shaft rotation ordinarily is adequate with a properly designed cam.

The action of motor 96 on cam 94 opposes the spring bias of lever 66 whereby, in equilibrium condition, the turning force of motor 96 urging lever 66 out of clamping position is balanced by the action of spring 88 on the lever urging it toward closed or full-clamp position. Thus it will be seen that the clamping action effected by this unit is reversely proportional to the power input to motor 96. Such power input to motor 96 is supplied by leads 102 from terminal posts 104 on base plate 62. Suitable connection is made, of course between these posts and control unit 22.

Various control circuits for effecting varied power input to motor 96 to obtain the desired drop rate can be employed. An illustration of a suitable circuit for this is given in FIG. 5 to which reference will now be made.

As already described, light source 28 in pickup 20 is positioned on one side of drop chamber 16, while the photocell 26 is located diametrically opposite, in the path of the beam from source 28. Suitable supply voltage, obtained from control unit 22, is applied through leads 56 to light source 28, and the illumination striking photocell 26 causes it to assume a given electrical resistance in the circuit of which it forms a part. As drops fall through the drop chamber 16, they interrupt the light path and accordingly produce temporary changes in resistance of the photocell circuit coincident with the passage of the drops. Thus a signal or pulse is produced in the photocell circuit each time a drop falls.

Referring to FIG. 5, this pickup pulse is fed to a conventional amplifier 110. In order to have an integrator output which is not affected by extraneous factors but which is dependent only on the repetition rate of the pickup pulse, which in turn of course corresponds to the drop rate, each pulse to be integrated must be made to have the same amplitude and duration. To insure that this condition is obtained, the pulses from pickup 20 are only used therefore to trigger a conventional one-shot multivibrator 112, of well-known circuitry. This multivibrator produces pulses of constant amplitude and duration for each triggering pulse received from the pickup.

These pulses of constant amplitude and duration from the multivibrator are then fed to an integrating circuit 114, again of conventional construction, where they are averaged, i.e. filtered, in a common resistance-capacitance network to obtain a unidirection output voltage whose amplitude is directly proportional to the frequency of the multivibrator pulses and, consequently, to the drop rate frequency in the drop chamber.

In order to provide a reference for automatically maintaining control of the drop rate, as well as means for selecting a desired rate, the output of the integration is applied to an adder circuit 115. This includes a center-tapped load resistor 116 and a rate-set potentiometer 118. In this circuit the voltages across the load resistor 116 and the tap of potentiometer 118 are added, or more accurately, a voltage is made to appear across the lower half of load resistor 116 which is proportional to the sum of the voltages across the entire load resistor plus that at the tap of the potentiometer. This voltage is proportional to the difference between the actual drop rate and that which is desired or selected. In other words it is an "error" signal whose value increases with deviation from the desired drop rate condition.

The error signal from the adder circuit is then fed to conventional driver and power amplifier circuit 120 in order to develop sufficient power to control the motor 96. The output stage of amplifier circuit 120 (in this specific illustration this output stage comprises transistor 122) is connected in parallel with resistor 124 positioned in series with the supply voltage to motor circuit 126. Operating power for the motor is supplied from regular A.C. mains 128 and is rectified by diode 130 in the motor circuit. Transistor 122 thus acts as a shunt across series resistor 124 so that in the non-conducting state, transistor 122 presents a high resistance having little effect on the series resistance of the motor circuit, but in its conducting state the transistor provides a low resistance path thus lowering the series resistance of the motor circuit and allowing more power to be fed to it.

Operation of the system as follows: At the start, due to normal closing bias of jaws 78, 80 in clamp mechanism 24, the outlet for fluid in reservoir 10 is closed and no flow can occur. Under these conditions, no pulse is produced by multivibrator 112 and consequently no signal delivered by integrator 14 to load resistor 116 of adder circuit 115. There is, however, a negative voltage developed at the tap of potentiometer 118 which is applied to amplifier circuit 120. Where, as under the assumed condition, there is a large error signal received in the amplifier, output transistor 122 becomes a low resistance shunt as just described across the motor circuit series resistor 124. This lowers the series resistance of the motor circuit, allowing more current to flow in it from mains 128. Motor 96 is thus driven to open jaws 78, 80, of clamp 24, allowing fluid to pass through the recipient set. Drops in the drop chamber resulting from this flow thereupon initiate pulses which result in an output from the integrator circuit which is proportional to the drop rate, as previously explained. This output voltage cancels or opposes some of the drive resulting from the signal produced by potentiometer 118. This lowers the error signal to the power amplifier and reduces the drive to the motor circuit, producing an increase in clamping or flow restricting action by clamp 24. The drop rate changes, changing the error signal, and this process continues until there is a dynamic balance among the rate-set voltage signal as developed by potentiometer 118, the output signal from the integrator 114 and the degree of clamping action (i.e. flow restriction) imposed by motor 96.

Hence, if the drop rate is too slow with reference to the desired rate selected by the rate-set potentiometer 118, the output from the integrator is lower and the power input to motor 96 is consequently greater, reducing the clamping action and reducing the restriction in the flow passage, allowing more fluid to flow to bring the drop rate up to balance condition. On the other hand, if the drop rate is fast, the integrator ouput voltage is high, opposing the rate-set voltage from potentiometer 118 and resulting in smaller drive from amplifier 120 and consequently less power input to motor 96. Since the mechanical or spring bias on clamping jaws 78, 80 can then counteract or overcome at least a part of the motor drive, the mechanical bias forces cam 94 on the motor shaft to move toward its low position, and this of course increases the clamping action of jaws 78, 80, restricting the fluid flow through tubing 12. Obviously, at equilibrium condition, the integrator output and rate-set voltage result in a power input to motor 96 which balances the mechanical closing bias to produce a setting of the clamp jaws giving the desired drop rate frequency.

While not necessary to the invention, it is often desirable in systems designed for use in medical treatment, such as for the blood transfusion and intravenous feeding purpose specifically mentioned hereinabove, to incorporate safety features to take care of temporary or permanent stoppage of fluid flow. Temporary stoppage could result, for example, from a change of position of the patient, whereby the vein into which the transfusion is being made is blocked by pressure of the patient's body on the vein. When this happens, fluid will build up in the drop chamber slightly, and then because it is a closed system, further flow will be stopped. This will occur long before the drop chamber becomes completely full, In any event, the output voltage from integrator 114 will drop off to zero. By placing a relay in the output of that circuit and providing a pair of contacts which are normally closed but held open by passage of output current from the integrator, failure of output from the integrator (indicative of stoppage of fluid flow) causes the relay to drop out, closing the contacts and thus energizing a warning circuit. The latter may include a device such as a light or bell located at some central point to indicate to the attendant that corrective action is necessary. Such a modification is shown schematically in FIG. 6. Further modification of this may include a time delay in the relay circuit to delay actuation of the relay for a brief period and give an opportunity for the system to continue normal operation should the patient move and thus remove the temporary blockage just discussed. Circuitry for effecting delay is well known and is accordingly not illustrated.

A permanent interruption will occur when reservoir 10 becomes empty, and in this event the recipient set should be detached from the patient, or else a new supply of fluid should be provided. The problem of determining when the reservoir is empty or is about to become empty, and of giving adequate warning of this, can be solved by utilizing the fact that in the lower part of the drop chamber, in which the filter is located, there is ordinarily a small buildup of fluid under normal flow conditions. However, if the reservoir becomes empty, this buildup will of course disappear. By placing a second sensor in the pickup, somewhat below the drop sensor so that it is in position to sense the level of the fluid above the filter in the drop chamber, interlocking signals can be used to maintain the equipment operative when flow has stopped only temporarily due to blockage of the outlet passage, but give warning of the exhaustion of the supply and/or turn off the entire control system (thereby causing clamp 24 to go to fully closed position).

These and other modifications of the system will be apparent to those skilled in the art and such changes as fall within the scope of the appended claims are accordingly intended to be covered.

What is claimed is:

1. In apparatus for sensing and controlling the drop rate of a fluid material, the combination comprising:
   (a) means defining a flow channel for said fluid having a vertically disposed drop chamber;
   (b) means for restricting the flow channel to produce dropwise flow of fluid material in said chamber;
   (c) drop sensing means disposed adjacent said chamber and including electronic circuit means producing pulses coincident with the drop rate therein;
   (d) other circuit means triggered by said drop pulses to produce pulses of constant magnitude and duration whose frequency is coincident with that of drop formation in said chamber;
   (e) additional circuit means to which said pulses of constant magnitude and duration are fed to produce a signal voltage whose amplitude is directly proportional to the drop rate in said chamber;
   (f) a source of selectable reference voltage and a circuit for impressing said reference voltage on said signal voltage to produce a resultant error signal;
   (g) a motor and motor circuit energized by said error signal; and
   (h) means mechanically connecting said motor to said restricting means to vary the setting thereof and maintain a predetermined drop rate as determined by said selected reference voltage.

2. Apparatus for sensing and controlling the dropwise flow of fluid material, comprising:
   (a) means defining a fluid flow channel having a vertically disposed section;
   (b) means for variably restricting the flow of fluid in said flow channel to produce free-falling drops in said channel section which includes means forming a drop chamber;
   (c) other means external to said channel section responsive to the drop-wise flow therein, said flow-responsive means including electronic sensor circuit means producing electrical pulses at a rate directly proportional to the drop rate in said section;
   (d) circuit means producing a signal voltage directly proportional to said drop rate;
   (e) a reference voltage and means for selectively tapping off a portion of said reference voltage;
   (f) a combining circuit for said signal and reference voltages to produce an error signal;
   (g) electromagnetic means responsive to said error signal and operatively connected to said flow restrictor means to vary the setting thereof and maintain a predetermined drop rate as determined by said selected reference voltage.

3. Apparatus as defined in claim 2, wherein said vertically disposed channel section is translucent and said drop rate sensing means comprises a light source and a photocell so disposed that the drop-wise flow in said channel interrupts the light beam from said illuminating source to said photocell.

4. Apparatus as defined in claim 2, wherein said fluid flow channel comprises a section of resilient tubing, and said variable flow restricting means comprises tube clamping means normally pinching said resilient tube section to stop the flow of fluid therethrough, said electromagnetic means acting on said clamping means to oppose the normal closing action thereof and allow fluid to pass through said channel.

5. Apparatus as defined in claim 4, wherein said flow restricting means comprises a first member and a pivoted clamping member adjacent said first member and defining between them a variable bite depending on the angular position of said pivotal clamp member, said variable bite being open laterally at one side of said member, and spring means normally biasing said pivoted clamp member toward said first member to close the bite between them and cut off the flow of fluid through said resilient tube; cam means operating on said pivoted clamp member to oppose the action of said bias spring and vary the bite between said members, and motor means for moving said cam, said motor means being responsive to said error signal from said combining circuit.

6. Apparatus for controlling the drop-wise flow of fluid material through a resilient tubing comprising clamp means for engaging said tubing and pinching it to effect variation in the restriction to flow of fluid therethrough, said clamp means comprising first and second pivotal members and a mounting base by which they are restrained for pivotal movement toward and away from each other; a complementary jaw member carried by each of said pivotal members, said jaw members defining a laterally open bite; means biasing said first member for pivotal movement toward said second member and control means for variably opposing said biasing means to alter the angular position of said first member relative to said second, whereby to vary the pinching of said tubing and thereby the restriction thereof to fluid flow; other means comprising an over-center spring toggle connected to said second member to restrain it normally in position relative to said first member to effect said pinching action by said jaws but pivotable manually to an alternate position away from said first member to open the bite between said jaw members sufficiently to permit lateral insertion of said resilient tubing therein without pinching; and means responsive to the rate of fluid flow through said tubing for varying said controlling means.

7. Apparatus as defined in claim 6, wherein said other means for variably opposing said biasing means of said first pivotal member comprises an eccentric engaging said first member at a point spaced on its extent from its pivot point; and motor means for angularly adjusting the position of said eccentric relative to said first pivotal member in opposition to the normal bias thereon.

8. In apparatus for sensing and controlling the drop rate of a fluid material, the combination comprising means defining a fluid flow channel having a vertically disposed chamber section, means for variably restricting the flow of fluid in said flow channel to produce free-falling drops in said chamber section, sensing means associated with said chamber section for producing electrical pulses at a rate directly proportional to the drop rate in said section, circuit means coupled to the sensing means for producing an output voltage which varies in accordance with the rate of receipt of the electrical pulses, and electromagnetic means responsive to said output voltage and operatively connected to said flow restrictor means for correctively varying the setting thereof for maintenance of a predetermined drop rate.

9. In apparatus for sensing and controlling the drop rate of a fluid material, the combination comprising means defining a fluid flow channel having a vertically disposed chamber section, means for variably restricting the flow of fluid in said flow channel to produce free-falling drops in said chamber section, sensing means associated with said chamber section for producing electrical pulses at a rate directly proportional to the drop rate in said section, circuit means including an integrator coupled to the sensing means for integrating the electrical pulses with respect to time and thereby producing an output voltage which varies in accordance with the rate of receipt of the electrical pulses, and electromagnetic means responsive to said output voltage and operatively connected to said flow restrictor means for correctively varying the setting thereof for maintenance of a predetermined drop rate.

10. In apparatus for sensing and controlling the drop rate of a fluid material, the combination comprising means defining a fluid flow channel having a vertically disposed chamber section, means for variably restricting the flow of fluid in said flow channel to produce free-falling drops in said chamber section, sensing means associated with said chamber section for producing electrical pulses at a rate directly proportional to the drop rate in said section, circuit means coupled to the sensing means for producing an output voltage which varies in accordance with the rate of receipt of the electrical pulses, electromagnetic means responsive to said output voltage and operatively connected to said flow restrictor means for correctively varying the setting thereof for maintenance of a predetermined drop rate, and means responsive to the lack of output voltage for signalling an alarm thereby to notify the operator of the apparatus of the discontinuance of flow.

References Cited in the file of this patent

UNITED STATES PATENTS

| | | |
|---|---|---|
| 2,622,837 | Goodman | Dec. 23, 1952 |
| 2,682,613 | Uhl | June 29, 1954 |
| 2,807,012 | Schwarz | Sept. 17, 1957 |
| 2,816,570 | Coulbourn et al. | Dec. 17, 1957 |
| 2,835,252 | Mauchel | May 20, 1958 |
| 2,980,802 | Bracey et al. | Apr. 18, 1961 |
| 3,013,578 | Askevold | Dec. 19, 1961 |
| 3,029,059 | Hamilton et al. | Apr. 10, 1962 |